United States Patent

Greipel

[15] 3,672,422

[45] June 27, 1972

[54] VEHICLE TRACTION DEVICE

[72] Inventor: Frank J. Greipel, 49 E. Larpenteur, St. Paul, Minn. 55117

[22] Filed: Oct. 9, 1970

[21] Appl. No.: 79,599

[52] U.S. Cl. ............................................. 152/222, 238/14
[51] Int. Cl. ......................................................... B60c 27/00
[58] Field of Search .................... 152/222 V, 220 V, 113 V; 238/14 V

[56] References Cited

UNITED STATES PATENTS

| 1,594,623 | 8/1926 | Lundberg | 238/14 |
| 2,428,680 | 10/1947 | Piatak | 238/14 |
| 1,500,249 | 7/1924 | McCracken et al. | 238/14 |

Primary Examiner—James B. Marbert
Attorney—Burd, Braddock & Bartz

[57] ABSTRACT

A traction device for use with automotive vehicles to assist in extrication of the vehicle from ice, snow, sand or mud, or the like. The traction device comprises a rigid or semi-rigid plate having an upper traction surface for engagement by the vehicle tire and having projecting members on the opposite surface adapted to bite or dig into the ice, snow, mud or sand in which the vehicle is stuck. Flexible means, such as chains, secured to the traction plate are provided for the purpose of firmly securing the traction mat to the vehicle tire at the interface with the material in which the vehicle is stuck. This causes the traction device to engage the tire temporarily but firmly for sufficient time to permit the traction plate to become firmly set into engagement with the ice, snow, mud or sand. Thereupon, further engagement between the moving tire tread and traction plate permits the vehicle to be readily extricated.

5 Claims, 6 Drawing Figures

PATENTED JUN 27 1972 3,672,422
SHEET 1 OF 2

INVENTOR.
FRANK J. GREIPEL
BY
Burd, Braddock & Bartz
ATTORNEYS

PATENTED JUN 27 1972 3,672,422

INVENTOR.
FRANK J. GREIPEL
BY Burd, Braddock & Bartz
ATTORNEYS

VEHICLE TRACTION DEVICE

This invention relates to a traction device for use with automotive vehicles to assist in extrication of the vehicle from ice, snow, sand or mud, or the like. Although traction devices of many forms have been proposed to free vehicles which become stuck because of ice, snow, mud or sand, none of these devices have found general acceptance. The devices of the prior art are generally expensive, heavy, cumbersome or ineffective, or all of these, with the result that most people when stuck under circumstances where a tow is unavailable or thought unnecessary attempt to extricate themselves with makeshift means. These include sand and ashes when one is stuck in ice or snow, or boards, burlap bags, pieces of carpeting, tire chains, expanded metal lathing, and the like. Such makeshift means are generally ineffective, principally because they are immediately caught by and spun out by the rotating traction wheel. Not only is the vehicle not freed but any onlookers standing by may be subjected to injury from the flying objects which are spun out at high velocity under great force.

The present traction device is intended to overcome most, if not all, of the deficiencies of the prior art devices, be they makeshift or expressly manufactured for the purpose of freeing stuck vehicles. Basically the traction device, according to the present invention, comprises a rigid or semi-rigid plate having an upper traction surface for engagement by the vehicle tire and having projecting members on the opposite surface adapted to bite or dig into the ice, snow, mud or sand in which the vehicle is stuck. Such means broadly have been suggested by the prior art. However, according to the present invention, flexible means secured to the traction plate are provided for the purpose of firmly securing the traction mat to the vehicle tire to engage the tire temporarily but firmly for sufficient time to permit the traction plate to become firmly set into engagement with the ice, snow, mud or sand. Thereupon further engagement between the moving tire tread and set traction plate permits the vehicle to be readily extricated.

The invention is illustrated in the accompanying drawings in which corresponding parts are identified by the same numerals and in which.

Figure 1:
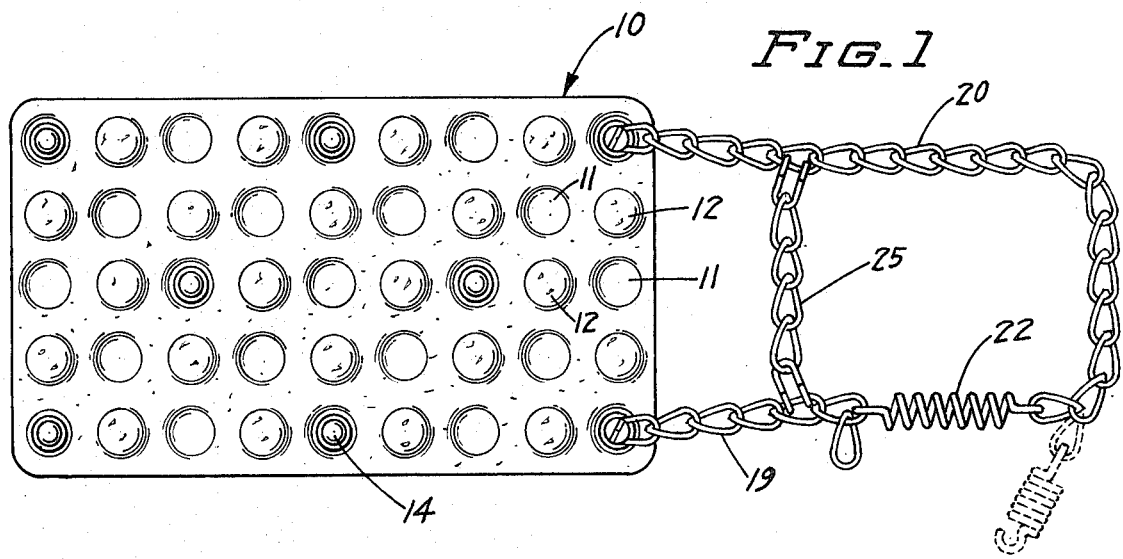
FIG. 1 is a plan view of one form of traction device.
Figure 2:
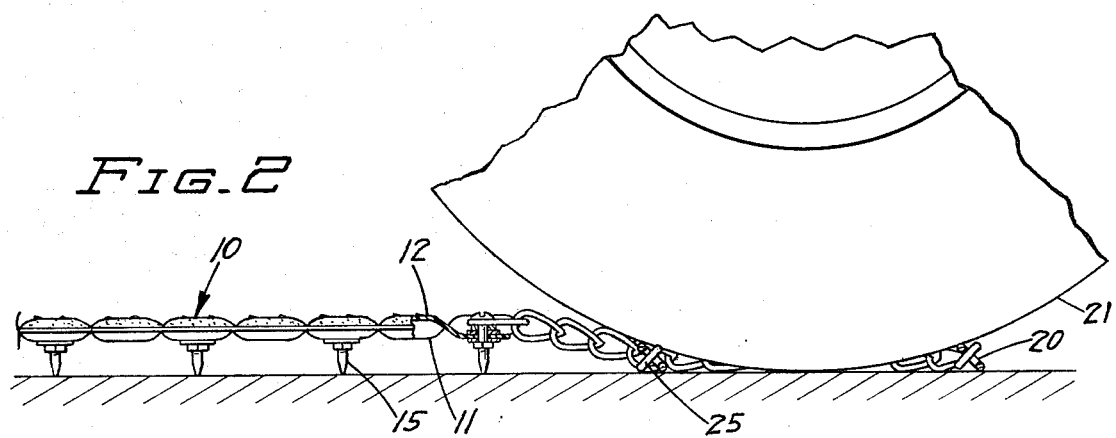
FIG. 2 is a fragmentary elevation, partly in section, showing the traction device in place relative to the vehicle wheel and ready to extricate the vehicle.
Figure 3:
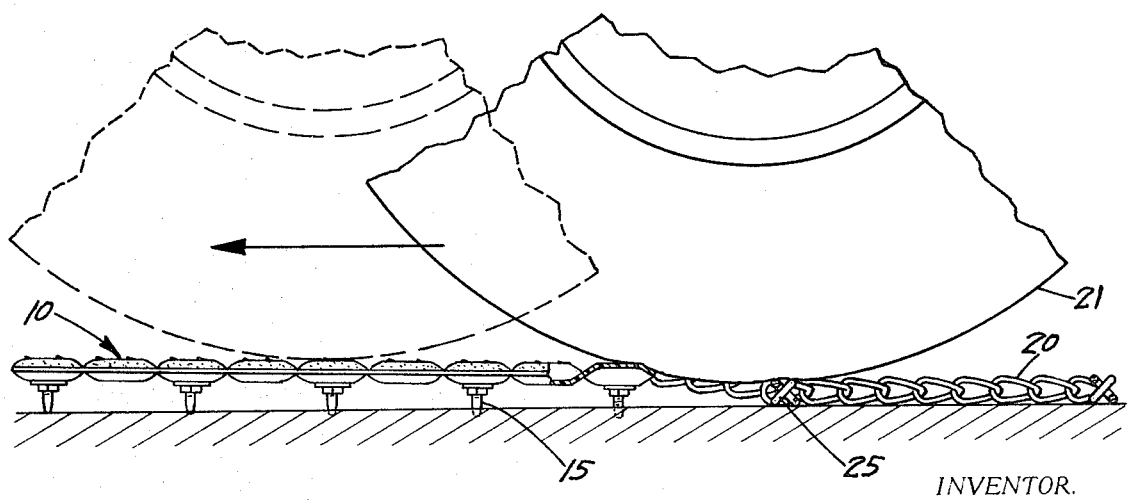
FIG. 3 is a similar fragmentary elevation showing the vehicle wheel in two positions immediately after the vehicle has begun to move relative to the traction device.
Figure 4:
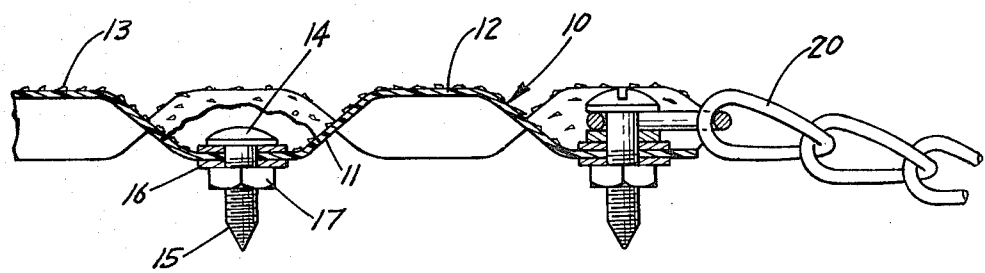
FIG. 4 is an enlarged fragmentary elevation, in section, showing details of construction of one form of traction mat.

Referring now to the drawings, and particularly to FIGS. 1, 2 and 3, the traction device of the present invention comprises an elongated generally flat traction plate 10 of width preferably equal to or slightly exceeding the width of the wheel of the vehicle to be extricated and of length from about two to four times the width. Traction plate 10 may be formed from any of a variety of materials. For example, it may be formed from a rigid material such as so-called "diamond plate" which is about ¼ inch steel plate having a cast or pressed diamond pattern surface for added traction or the stamped perforated plates commonly used for grating etc., and known as "Grip Struts." It may be semi-rigid formed from flat heavy reinforced rubber belting, such as is used for conveyor belts. A preferred material, as illustrated, because of its strength, semi-flexibility, light weight and good traction properties is the relatively new fiberglass reinforced plastic matting developed and produced by Air Logistics Corporation of Pasadena, California under the proprietary name MO-MAT. This material is molded with a waffle-like nodular structure composed of alternating shallow concave and convex dish-like projections 11 and 12, respectively. The concave and convex projections alternate in longitudinal and transverse rows. Alternating diagonal rows are made up entirely of concave projections 11 or convex projections 12. An adhesive non-skid granular material 13 is bonded to the top surface. This provides a dual traction surface formed in part of the waffle surface pattern and in part from the granular non-skid material.

Regardless of the specific material from which plate 10 is formed, the overall structure and operation of the traction device are the same. The lower surface of plate 10 is provided with a plurality of ground gripping elements distributed substantially uniformly and projecting from the undersurface of the plate 10 and adapted to bite or dig into the ice, snow, mud or sand under pressure of the weight of the vehicle being extricated. These ground engaging elements may take the form of cleats or sharpened pegs or spikes, such as sharpened bolts 14 whose threaded extremities 15 are provided with chisel-like ground engaging points. Each such spike-bolt member extends through a hole in the plate and washers 16 and is rigidly secured by nut 17.

Figure 5:
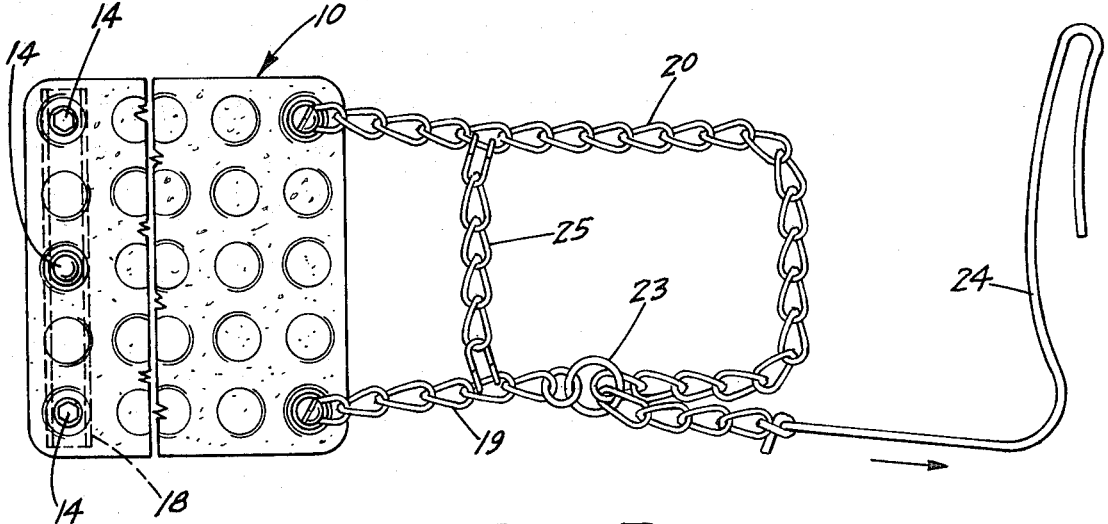
FIG. 5 is a plan view showing an alternative form of traction device according to the present invention.
Figure 6:
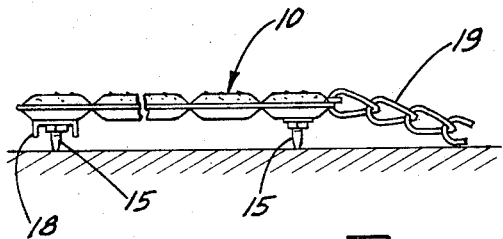
FIG. 6 is a fragmentary side elevation of the traction device of FIG. 5.

Alternatively, the ground engaging member may take the form of a transverse channel iron or angle iron. Preferably, as shown in FIGS. 5 and 6, spike members 15 may be combined with channel members 18 for maximum engagement with the slippery surface. Where only a single angle iron or channel iron 18 is used, it is preferably disposed adjacent the trailing end of plate 10. The downwardly projecting blade-like members of transverse channel or angle irons (which may be sharpened) help inhibit and limit longitudinal movement of the traction device during use.

A flexible tire engaging member is secured to the leading edge of traction plate 10. This is for the purpose of pulling the forward edge of the traction plate partially under the tire so as to permit almost instantaneous engagement of the traction plate by the tire surface when the wheel is rotated. Preferably, as illustrated, the flexible tire engaging means is formed from chain. One relatively short length of chain 19 is secured to the traction plate 10 adjacent the leading or forward edge and adjacent one side, preferably by means of a bolt-spike 14–15. A longer length of chain 20 is similarly attached to the forward edge of the traction plate along the opposite side edge.

The longer length of chain 20 is of sufficient length that it may extend around the ground engaging interface portion of a tire 21 and be connected to the short length of chain 19 in a loop extending around the tire. The connection may be in the form of a strong helical spring 22, as shown in FIG. 1 where the hook-like member at one end of the spring engages an end link of the shorter length of chain. Alternatively, as shown in FIG. 5, a fastening ring 23 may be secured to the free end of the short length of chain 19 such that the free end of the longer length of chain 20, after passing around the tire, may be inserted through the ring 23 and pulled tight.

Preferably a length of cord 24, such as strong nylon cord or the like, is attached to the free end of the longer length of chain 20 to facilitate tightening the loop extending around the tire. Preferably cord 24 is of sufficient length to permit it to be tied to the car bumper or the like. In this manner, as the vehicle is being extricated, the operator need not lose momentum by the necessity of having to stop to retrieve the traction device. Instead, it is merely pulled and dragged along until the vehicle has reached a point where it may be convenient to stop and recover the traction device.

One or more short lengths of cross-linking chain 25 are desirably provided extending transversely between chains 19 and 20 generally parallel to and spaced slightly forwardly from the leading edge of the traction plate 10 as shown, or on top of the leading edge of the traction plate. In this way the ground-engaging portion of the tire is completely surrounded by a loop of chain which is pulled as tight as possible so as to insure snug engagement between the chain and the tire, particularly the side tire tread at the interface with the slippery surface.

As seen in FIGS. 2 and 3, the traction device is positioned relative to the tire of the drive wheel in the direction in which it is desired to move the vehicle. If the vehicle is to be backed up, the traction device is installed rearwardly of the tire, and vice versa. The chain 20 is passed around the tire, pulled as tightly as possible into close engagement with the surfaces of tire 21 and connected to chain 19. Where cord 24 is included, it is tied to the opposite bumper. The vehicle is then started.

Because of the snug engagement between the chain members and the tire surface, as the wheel rotates, the tread of the tire engaging the chain tends to pull the chain in the direction of rotation. This causes the traction mat 10 to be pulled slightly toward the tire into engagement between the tire surface and the top surface of plate 10. As soon as the weight of the vehicle is applied to the plate, the elements 15 are forced into biting or gripping engagement with the surface of the ice, snow, mud or sand from which the vehicle is to be extricated. As a result of elements 15 biting into the slippery surface, the longitudinal movement of the plate is relatively small.

As soon as the downwardly projecting members, be they spikes, cleats, channel iron, angle iron or the like, bite into and become firmly engaged with the miring surface, further longitudinal movement of plate 10 ceases and the tire engages the top traction surface of the plate and rolls out over it, freeing the vehicle from the ice, snow, mud or sand. Once the vehicle has become completely extricated such that it may be stopped without again becoming mired in the ice, snow, mud or sand, the traction device may be retrieved and the operator may continue on his journey.

In many instances, only one driving wheel becomes mired, such as to require extrication from ice, snow, mud or sand. Where two wheels become stuck, then, of course, the traction device is desirably used in pairs. In this instance, it is desirable that the devices be provided in right hand and left hand models so as to facilitate somewhat the placing of the chain 20 around the tire and to facilitate connecting it to the chain 19.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A vehicle traction device for automotive vehicles comprising:
    A. an elongated generally flat traction plate, said plate being at least semi-rigid and having
        1. a top high-friction traction surface, and
        2. a plurality of spaced apart gripping members projecting from the bottom surface of said plate,
    B. flexible linear wheel engaging means attached to said plate, said wheel engaging means comprising
        1. a pair of lengths of chain each attached adjacent to the leading edge of said plate adjacent one side edge thereof, the combined length of said chains being at least great enough to extend around the interface between the wheel in conjunction with which the traction device is used and the surface on which the wheel is resting, and
        2. a further relatively short transversely extending chain spaced adjacent to the leading edge of the traction plate, extending generally parallel to said edge, said further chain extending between and being connected at its ends to said first named two chains, and
        3. connecting means for detachably securing said first named two chains together.

2. A vehicle traction device according to claim 1 further characterized in that said gripping members comprise a plurality of pointed spike-like elements disposed substantially uniformly over the area of said plate.

3. A vehicle traction device according to claim 1 further characterized in that said gripping members include at least one transverse downwardly depending blade-like member projecting from the bottom surface of the traction plate adjacent the trailing edge thereof.

4. A vehicle traction device according to claim 1 further characterized in that said connecting means include a ring-like member comprising part of one of said lengths of chain through which the free end of the other of said lengths of chain is adapted to be passed.

5. A vehicle traction device according to claim 4 further characterized in that a strong flexible cord member is secured to said other length of chain to assist in passing said length of chain through the ring-like member and to attach the traction device to the vehicle.

* * * * *